FREE-RUNNING SQUARE WAVE GENERATOR

Filed Jan. 16, 1952

INVENTORS
Raymond P. Moore, Jr.
& Richard O. Endres
BY [signature]
ATTORNEY

United States Patent Office 2,750,510
Patented June 12, 1956

2,750,510

FREE-RUNNING SQUARE WAVE GENERATOR

Raymond P. Moore, Jr., Haddonfield, and Richard O. Endres, Moorestown, N. J., assignors to Radio Corporation of America, a corporation of Delaware Application January 16, 1952, Serial No. 266,649

7 Claims. (Cl. 250—36)

This invention relates generally to oscillators, and particularly relates to a free-running oscillation generator which will develop square-topped pulses at a predetermined repetition rate.

A free-running square wave generator may be defined as an oscillation generator having two states of stable equilibrium. The generator periodically changes from one state of stable equilibrium to the other thereby to develop substantially square-topped output pulses. A conventional pulse generator usually requires a pair of thermionic tubes. Accordingly, the power consumption of such a square wave generator is relatively high and a large portion of the power which is not represented by the output wave must be dissipated as heat. It is usually desirable that the pulse repetition rate be predetermined and that the wave shapes of the output pulses be sharp which, in turn, requires that the transition between one state of equilibrium and the other be as rapid as possible.

It is accordingly an object of the present invention to provide an improved free-running square wave generator including a single transistor device which is efficient and requires but little power.

Another object of the invention is to provide an improved free-running transistor pulse generator having a pulse repetition rate which is stable and which can easily be predetermined.

A further object of the invention is to provide a bistable transistor oscillator which will develop sharp, square-topped pulses of equal width in either direction or polarity and which may be utilized as a time base for computors and the like.

A bistable triggered or flip-flop circuit which has been disclosed and claimed in the patent to Everett Eberhard, 2,533,001 of December 5, 1950, is utilized in accordance with the present invention to provide a pulse generator. As shown in Figure 3 of the Eberhard patent, a resistor connected to the base of the transistor will provide such a bistable circuit which, however, has to be triggered from one stable state to the other. In accordance with the present invention, this bistable circuit is triggered automatically by the provision of an open-circuited delay line connected to the emitter.

In this manner, a pulse generator is obtained having two conditions of stable equilibrium corresponding to a state of high current conduction and a state of low current conduction. When the circuit changes from one state to the other, a wave is developed at the emitter which travels along the open-circuited delay line coupled thereto. At a time corresponding to twice the delay time of the open-circuited line the same pulse appears again at the emitter and retriggers the oscillator into its other state of stable equilibrium. Square-topped pulses may be derived from the collector, for example, which are symmetrical, that is, which have equal width in either direction or polarity.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 4 is a graph illustrating current gain as a function of emitter current.

Figure 1:
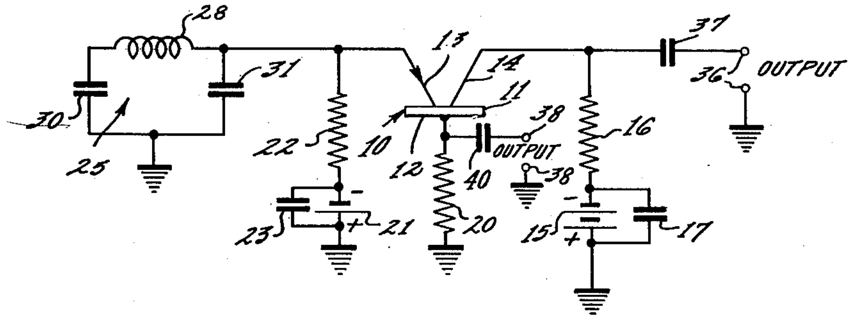
Figure 1 is a circuit diagram of a square wave generator embodying the present invention.
Figure 1:
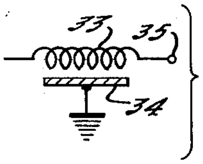

The pulse generator of Figure 1 includes a transistor schematically indicated at 10 having a semi-conducting body 11 such as a crystal of germanium and a base electrode 12, an emitter electrode 13 and a collector electrode 14 in contact with the body 11. Such transistors are now well known and a further description thereof is not believed to be necessary.

Normally a transistor requires a bias voltage in the reverse direction between collector 14 and base 12 and a bias voltage in the forward direction between emitter 13 and base 12. If the body 11 is of the N type as will be assumed in the subsequent description, the collector 14 should be negative and the emitter 13 positive with respect to the base 12. If the crystal should be of the P type, the polarities of the applied voltages should be reversed.

For the purpose of applying a bias voltage in the reverse direction between the collector 14 and base 12, there may be provided a source of voltage such as a battery 15 having its positive terminal grounded while its negative terminal is connected to the collector 14 through resistor 16. The battery 15 may be bypassed by bypass capacitor 17. Base 12 is grounded through base resistor 20. Since the collector current also flows through base 12 and base resistor 20, the voltage of base 12 will be negative with respect to ground as long as there is a flow of collector current. Accordingly, since the emitter 13 should be only slightly positive with respect to base 12, the emitter 13 should be maintained at a less negative potential than the negative base potential. To this end there may be provided a battery 21 having its positive terminal grounded while its negative terminal is connected to emitter 13 through dropping resistor 22. Battery 21 may be bypassed through bypass capacitor 23. It is to be understood, however, that battery 21 should develop such a voltage that emitter 13 will be normally positive with respect to the base 12.

Figure 2:
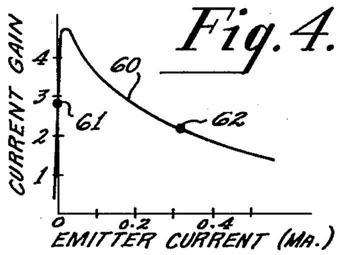
Figure 2 is a schematic representation of an open-circuited delay line which may be used in the circuit of Figure 1.
Figure 3:
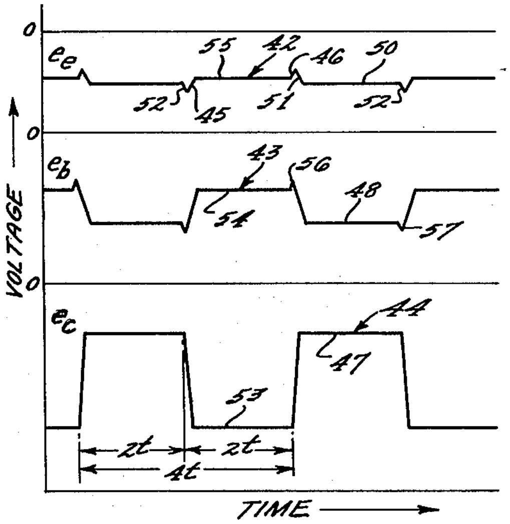
Figure 3 is a graph illustrating the voltages at the three electrodes of the transistor of the generator of Figure 1 as a function of time.

The circuit as described so far is essentially the same as that illustrated in Figure 3 of the Eberhard patent referred to. In accordance with the present invention, an open-circuited delay line 25 is coupled or connected between emitter 13 and ground. The delay line may consist, for example, of one or more sections, each section including an inductor 28 the terminals of which are bypassed to ground by capacitors 30 and 31. However, it is to be understood that any artificial delay line or transmission line may be used instead. Thus, as illustrated in Figure 2, the delay line may consist of an inductor 33 having a metallic shield 34 which is grounded thereby to provide distributed capacitance between the inductor 33 and ground. The terminal 35 of the delay line shown in Figure 2 may be connected to the coupling capacitor 26 in Figure 1 instead of the delay line 25. A transmission line such as a coaxial line or a parallel wire line may also be used provided there is sufficient space for the line. The length of a transmission line and its associated constants determine the time delay provided thereby.

The output pulses may be obtained, for example, from output terminals 36 one of which is grounded, while the other one is coupled through coupling capacitor 37 to the collector 14. It is also feasible to obtain output pulses from the output terminals 38 of which one is grounded while the other is coupled through capacitor 40 to the base 12. Preferably, however, the output pulses are obtained across collector resistor 16. It is to be understood, however, that collector resistor 16 may be omitted as shown in the Eberhard patent above referred to and in that case, the output pulses must be obtained across the base resistor 20.

The operation of the pulse generator of Figure 1 may best be explained by reference to Figure 3 wherein curve 42 illustrates the emitter voltage $e_e$, curve 43 the base voltage $e_b$ and curve 44 the collector voltage $e_c$, a zero line being indicated for each curve 42, 43 and 44. Let it be assumed that the pulse generator has just changed from a state of high current conduction to a state of low current conduction. At this instant a positive voltage wave 45 appears at the emitter. This positive voltage wave is propagated down the delay line 25 and since the delay line is open-circuited at its far end, the positive voltage wave is reflected without change of polarity and returns to the emitter after an interval $2t$, where $t$ is the delay time of the delay line 25. Accordingly, after a time of $2t$ the positive voltage wave 45 reappears as shown at 46 at the emitter.

Prior to this instant, the pulse generator is at a state of low current conduction and accordingly the positive voltage wave 46 will trigger the transistor into a state of high current conduction. This is, of course, due to the fact that larger positive bias between emitter 13 and base 12 will increase the collector current. The increased collector current is evidenced by the less negative collector voltage shown by the curve portion 47. At the same time, due to the higher collector current, the base current will also be larger resulting in a more negative base voltage as shown at 48. Consequently, the voltage drop between emitter 13 and base 12 becomes quite large which results in a larger emitter current. This represents positive feedback or regeneration. The emitter voltage now becomes slightly more negative as shown by curve portion 50. However, the emitter still remains more positive with respect to the base than is the case when the transistor is in a state of low current conduction. It will now be seen that the emitter voltage must drop from the positive peak indicated by curve portion 46 to its lower voltage shown at 50 to develop a negative wave front 51 when the generator goes from a state of low current conduction to a state of high current conduction.

The negative wave front 51 developed at the emitter 13 when the transistor changes from a state of low conduction to one of high conduction is propagated down the delay line 25 and is eventually reflected and appears again at the emitter at a time $2t$ later to develop a negative pulse 52. This negative wave front 52 now triggers the pulse generator into its state of low current conduction because the effective bias voltage between emitter 13 and base 12 is reduced which, in turn, reduces the collector current as evidenced by the more negative collector voltage shown by curve portion 53. The lower collector current causes a lower base current so that the base voltage as indicated by curve portion 54 becomes less negative.

It will be noted that during the state of high current conduction corresponding to a large collector current, the emitter voltage as shown by curve portion 50 is more negative, thus indicating a higher emitter current. On the other hand, during low current conduction, that is, when the collector current is low, the emitter voltage as shown by curve portion 42 is less negative thus indicating a smaller emitter current. It will also be noted that the power required by the pulse generator of the invention is low because the high current conduction takes place at a corresponding low collector voltage while the low current conduction takes place at a comparatively high collector voltage.

It will be noted that the negative wave front 52 carries the emitter voltage below its normal or stable low level shown by curve portion 50 thereby increasing the height of the positive wave front 45 which triggers the generator upon its reappearance on the emitter 13 from its state of low conduction to its state of high conduction. This makes the trigger action more positive because the amplitude of the original positive pulse or wave front 45 is larger than the difference between the two normal emitter voltages indicated by the curve portions 50 and 55 so that it will retrigger the circuit as shown by curve portion 46 even if the pulse amplitude is attenuated due to dissipation in the delay line 25. For a similar reason the negative pulse or wave front 51 is also larger than the difference between the two stable emitter voltages.

The base resistor 20 has a regenerative effect and, therefore, provides for a very rapid transition between the two stable states of operation of the pulse generator. This, in turn, provides for a collector voltage wave 44 which is substantially square topped and which has very steep sides. Furthermore, wave 44 is symmetrical, that is, portions 47 and 53 have equal width. It will be noticed that the base voltage wave 43 has a positive peak 56 and a negative peak 57 which correspond to the positive emitter wave 46 and the negative wave 52 respectively. This is due to the fact that the base voltage 43 follows substantially the emitter voltage 42. It will be understood that oscillation of the circuit of Figure 1 will be initiated by any voltage transient of sufficient amplitude such as the initial application of voltage to the circuit. The pulse repetition rate is determined by the delay time of the delay line 25 and corresponds to $4t$. The collector voltage wave 44 may be obtained from output terminals 36 and the base voltage wave 43 from the output terminals 38.

The pulse generator of the invention requires a transistor having a current gain greater than unity as explained in the Eberhard patent referred to. In other words, the transistor should have a range of operating voltages providing short-circuit collector current increments which are larger than corresponding emitter current increments. The current gain is usually designated by $\alpha$ and accordingly the pulse generator of the invention requires a transistor wherein $\alpha$ is greater than unity.

The two stable states of current conduction of the square wave generator of the invention may be explained in the following manner and by reference to Figure 4. In Figure 4 the current gain 60 as defined hereinabove is plotted against the emitter current. Two points 61 and 62 of approximately unity gain are obtained on curve 60 corresponding respectively to an equilibrium state of low current conduction and of high current conduction. In the emitter current region between these two points 61 and 62, the current gain is above unity and the circuit will accordingly be unstable within that region. Outside of this region, that is, to the left of point 61 and to the right of point 62 the current gain is below unity and, therefore, the circuit will be stable on either side of the two points 61 and 62.

While it will be understood that the circuit specifications of the pulse generator of the invention may vary according to the design for any particular application, the following circuit specifications are included by way of example only:

| | | |
|---|---|---|
| Collector resistor **16** | ohms | 18,000 |
| Base resistor **20** | do | 2,200 |
| Emitter resistor **22** | do | 1,800 |
| Coupling capacitor **26** | microfarad | .25 |
| Time delay of delay line **25** | microseconds | 8.5 |

There has thus been disclosed a pulse generator which requires but a single transistor. The pulse generator has a repetition rate determined by the time delay of an open-circuited delay line and its frequency is substantially independent of the other circuit parameters. The transition from one state of stable operation to the other is determined by the frequency response of the transistor and is, accordingly, rapid. The output wave consists of square-topped pulses having equal width in either direction.

What is claimed is:

1. A free-running pulse generator having a predetermined repetition rate and comprising a transistor including a semi-conducting body, a base electrode, an emitter electrode and a collector electrode in contact with said body, means connected to said electrodes for applying a bias voltage in the reverse direction between said collector and base electrodes and for applying a bias voltage in the forward direction between said emitter and base electrodes, a first impedance element effectively coupling said emitter and base electrodes, a second impedance element connected in circuit with said emitter electrode, and an open-circuited delay line coupled to said emitter electrode for propagating voltage waves corresponding to emitter voltage variations to the open-circuited end thereof and for reflecting and applying said voltage waves to said emitter to vary the current conducting condition of said transistor for determining said repetition rate, said transistor having a range of operating voltages for which short-circuit collector current increments are larger than corresponding emitter current increments.

2. A free-running pulse generator having a predetermined repetition rate and comprising a transistor including a semi-conducting body, a base electrode, an emitter electrode and a collector electrode in contact with said body, means connected between a common junction point and said emitter and collector electrodes for applying a bias voltage in the reverse direction between said collector and base electrodes and for applying a bias voltage in the forward direction between said emitter and base electrodes, a first impedance element connected between said junction point and said base electrode, a second impedance element connected between said junction point and said emitter electrode, and an open-circuited delay line coupled between said emitter electrode and said junction point for propagating voltage waves corresponding to emitter voltage variations to the open-circuited end thereof and for reflecting and applying said voltage waves to said emitter to vary the current conducting condition of said transistor for determining said repetition rate, said transistor having a range of operating voltages for which short-circuit collector current increments are larger than corresponding emitter current increments.

3. A free-running pulse generator having a predetermined repetition rate and comprising a transistor including a semi-conducting body, a base electrode, an emitter electrode and a collector electrode in contact with said body, means connected between a common junction point and said emitter and collector electrodes for applying a bias voltage in the reverse direction between said collector and base electrodes and for applying a bias voltage in the forward direction between said emitter and base electrodes, impedance elements connected individually between said junction point and said electrodes, and an open-circuited delay line coupled between said emitter electrode and said junction point for propagating voltage waves corresponding to emitter voltage variations to the open-circuited end thereof and for reflecting and applying said voltage waves to said emitter to vary the current conducting condition of said transistor for determining said repetition rate, said transistor having a range of operating voltages for which short-circuit collector current increments are larger than corresponding emitter current increments.

4. A pulse generator as defined in claim 3 wherein an output circuit is coupled across the impedance element connected to said collector electrode for deriving pulses at said repetition rate determined by the time delay of said delay line.

5. A pulse generator as defined in claim 3 wherein an output circuit is coupled across the impedance element connected to said base electrode for deriving pulses at said repetition rate determined by the time delay of said delay line.

6. A free-running pulse generator having a predetermined repetition rate and comprising a transistor including a semi-conducting body, a base electrode, an emitter electrode and a collector electrode in contact with said body, a first source of voltage and a first resistor connected serially between a common junction point and said collector electrode, a second source of voltage and a second resistor connected serially between said junction point and said emitter electrode, a third resistor connected between said junction point and said base electrode, said first source being poled to apply a voltage in the reverse direction between said collector and base electrodes, said second source being poled to apply a voltage in the forward direction between said emitter and base electrodes, said transistor having a range of operating voltages providing short-circuit collector current increments which are larger than corresponding emitter current increments, an open-circuited delay line coupled between said junction point and said emitter electrode for propagating voltage waves corresponding to emitter voltage variations to the open-circuited end thereof and for reflecting and applying said voltage waves to said emitter to vary the current conducting condition of said transistor for determining said repetition rate, and an output circuit coupled across said first resistor for deriving pulses at said repetition rate determined by the time delay of said delay line.

7. A free-running pulse generator having a predetermined repetition rate and comprising a transistor including a semi-conducting body, a base electrode, an emitter electrode and a collector electrode in contact with said body, a first source of voltage connected between a common junction point and said collector electrode, a second source of voltage and a first resistor connected serially between said junction point and said emitter electrode, a second resistor connected between said junction point and said base electrode, said first source being poled to apply a voltage in the reverse direction between said collector and base electrodes, said second source being poled to apply a voltage in the forward direction between said emitter and base electrodes, said transistor having a range of operating voltages providing short-circuit collector current increments which are larger than corresponding emitter current increments, an open-circuited delay line coupled between said junction point and said emitter electrode for propagating voltage waves corresponding to emitter voltage variations to the open-circuited end thereof and for reflecting and applying said voltage waves to said emitter to vary the current conducting condition of said transistor for determining said repetition rate, and an output circuit coupled across said second resistor for deriving pulses at said repetition rate determined by the time delay of said delay line.

References Cited in the file of this patent

UNITED STATES PATENTS

| | | |
|---|---|---|
| 2,212,173 | Wheeler et al. | Aug. 20, 1940 |
| 2,406,871 | Varela | Sept. 3, 1946 |
| 2,417,834 | Lord | Mar. 25, 1947 |
| 2,436,808 | Jacobsen et al. | Mar. 2, 1948 |
| 2,447,082 | Miller | Aug. 17, 1948 |
| 2,463,073 | Webb | Mar. 1, 1949 |
| 2,533,001 | Eberhard | Dec. 5, 1950 |
| 2,556,296 | Rack | June 12, 1951 |
| 2,681,996 | Wallace | June 22, 1954 |